United States Patent
Morrison et al.

(10) Patent No.: US 6,601,238 B2
(45) Date of Patent: Jul. 29, 2003

(54) PROVIDING A LINK TO PROGRAMS IN A PROGRAM GUIDE

(75) Inventors: Hugh Boyd Morrison, Marion, IN (US); Mark Sheridan Westlake, Hamilton, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/219,744

(22) Filed: Dec. 22, 1998

(65) Prior Publication Data

US 2002/0073427 A1 Jun. 13, 2002

(51) Int. Cl.⁷ .............................. H04N 5/44; H04N 9/64
(52) U.S. Cl. .............................. 725/50; 725/45; 725/53
(58) Field of Search .............................. 348/559, 560, 348/576, 578, 722; 725/45, 53, 58, 46, 50; H04N 5/44, 9/64

(56) References Cited

U.S. PATENT DOCUMENTS

| | | | | |
|---|---|---|---|---|
| 5,465,113 A | * | 11/1995 | Gilboy | 725/45 |
| 5,479,268 A | * | 12/1995 | Young et al. | 725/56 |
| 5,585,838 A | * | 12/1996 | Lawler et al. | 725/45 |
| 5,596,373 A | * | 1/1997 | White et al. | 725/53 |
| 5,635,989 A | * | 6/1997 | Rothmuller | 725/45 |
| 5,699,107 A | * | 12/1997 | Lawler et al. | 725/53 |
| 5,822,123 A | | 10/1998 | Davis et al. | |
| 5,828,419 A | | 10/1998 | Bruette et al. | |
| 5,867,226 A | * | 2/1999 | Wehmeyer et al. | 725/53 |
| 5,883,677 A | * | 3/1999 | Hofmann | 725/53 |
| 5,926,230 A | * | 7/1999 | Niijima et al. | 725/53 |
| 6,005,565 A | * | 12/1999 | Legall et al. | 725/45 |
| 6,061,056 A | * | 5/2000 | Menard et al. | 725/45 |
| 6,075,526 A | * | 6/2000 | Rothmuller | 725/45 |
| 6,133,909 A | * | 10/2000 | Schein et al. | 725/53 |
| 6,177,931 B1 | * | 1/2001 | Alexander et al. | 345/327 |
| 6,216,264 B1 | | 4/2001 | Maze et al. | |
| 6,247,176 B1 | * | 6/2001 | Schein et al. | 725/43 |
| 6,266,814 B1 | * | 7/2001 | Lemmons et al. | 725/44 |
| 6,298,482 B1 | * | 10/2001 | Seidman et al. | 725/100 |
| 6,499,138 B1 | * | 12/2002 | Swix et al. | 725/38 |

FOREIGN PATENT DOCUMENTS

| | | |
|---|---|---|
| EP | 721253 A2 | 7/1996 |
| EP | 774868 A1 | 5/1997 |
| WO | WO97/48228 | 12/1997 |
| WO | WO98/21878 | 5/1998 |

OTHER PUBLICATIONS

PCT Search Report dated Apr. 13, 2000 as cited in corresponding PCT application.

* cited by examiner

Primary Examiner—John Miller
Assistant Examiner—Brian Yenke
(74) Attorney, Agent, or Firm—Joseph J. Tripoli; Joseph J. Laks; Frank Y. Liao

(57) ABSTRACT

A method and a system for displaying program information for a plurality of information sources on an electronic program guide (EPG) is described. A matched program and its respective program source is first determined. This first matched program from the respective program source is then highlighted in the EPG. Additionally, an icon for a respective program source is displayed indicating a future or a previously matched program from the respective program source.

20 Claims, 8 Drawing Sheets

| PROGRAM GUIDE | | TUESDAY 7/22/97<br>FAMILY | | INTERNET  E MAIL | 5:09PM |
|---|---|---|---|---|---|
| 7/22 | 5:00PM | 5:30PM | 6:00PM | 6:30PM | |
| 202 CNN | WORLDVIEW | | MONEYLINE | 7/23 11PM | |
| 206 ESPN | UP CLOSE | SPORTSCENTER | ESPN.com | 7/25 3PM | |
| 213 HSN | GARDEN... | HOME FU... | BUYER'S M... | 7/24 2AM | |
| 253 USA | RENEGADE | | WINGS | | |
| 275 CNBC | BUSINESS... | BUSINESS... | MONEY | 7/24 10PM | |
| 910 HBO | APOLLO 13 | | | | |
| 966 MTV | SINGLED OUT | TOP 10 VIDEO | COUNTDO... | | |

FIG. 2

| PROGRAM GUIDE | | TUESDAY 7/22/97<br>FAMILY | | INTERNET  E MAIL | 5:09PM |
|---|---|---|---|---|---|
| 7/23 | 10:30PM | 11:00PM | 11:30PM | | 12:00AM |
| 202 CNN | 7/22 5:30PM | SPORTSWORLD | NEWS | | |
| 206 ESPN | HISTORY | FOOTBALL | | | 7/25 3PM |
| 213 HSN | | WW I | WW II | | 7/24 2AM |
| 253 USA | RUN | | ROLLER | | |
| 275 CNBC | REVIEW | TALK | | | 7/24 10PM |
| 910 HBO | | MOVIE OF | | | |
| 966 MTV | | BEST OF MJ | | | |

| 7/23 | PROGRAM GUIDE 10:30PM | TUESDAY 7/22/97 FAMILY 11:00PM | 11:30PM | INTERNET E MAIL 12:00AM |
|---|---|---|---|---|
| 202 CNN | | SPORTSWORLD | NEWS | |
| 206 ESPN | 1 | FOOTBALL | | 2 |
| 213 HSN | HISTORY | WW I | WW II | 2 |
| 253 USA | | RUN | ROLLER | |
| 275 CNBC | REVIEW | TALK | | 2 |
| 910 HBO | | MOVIE OF | | |
| 966 MTV | | BEST OF MJ | | |

300', 301', 302', 203', 204', 205'

EXIT  ?  …  A-Z  …  MENU

PROVIDING A LINK TO PROGRAMS IN A PROGRAM GUIDE

FIELD OF INVENTION

This invention generally relates to the field of program guide information processing and more particularly, to a system and method of processing and displaying program guide information so that information about an existence of a selected program in a program guide can be easily conveyed to a user.

BACKGROUND OF INVENTION

Electronic devices such as televisions and personal computers (PC) require a control system that includes a user interface system. Typically, a user interface provides information to a user and simplifies use of the device. One example of a user interface is an Electronic Program Guide (EPG) in a television system.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG which typically ranges from the next hour up to several days. The information contained in an EPG includes programming characteristics such as, for example, channel number, program title, start time, end time, elapsed time, time remaining, rating (if available), topic, theme, and a brief description of the program's content. EPGs are usually arranged in a two-dimensional table or grid format with time information on one axis and program source information such as channel information on the other axis.

Unlike non-interactive guides that reside on a dedicated channel and merely scroll through the current programming on the other channels for the next 2 to 3 hours, EPGs allow viewers to select any channel at any time during some period into the future, e.g., up to several days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device. Such EPGs are known in the art and described, for instance, in U.S. Pat. Nos. 5,353,121; 5,479,268; and 5,479,266 issued to Young et al. and assigned to StarSight Telecast, Inc.

In addition, U.S. Pat. No. 5,515,106, issued to Chaney et al., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., title, rating, star, etc.) relating to a program may be transmitted from a program guide database provider to a receiving apparatus efficiently.

User interfaces such as EPGs are applicable to analog and digital television systems and to other electronic devices such as personal computers. As electronic devices become increasingly complex with a multitude of features, the need for a robust and easy-to-use user interface becomes ever more important. For example, separate electronic systems having respective interfaces for controlling features of each system are now being combined into a single system requiring a single user interface. One specific example is the so-called PCTV which includes features of both a personal computer and a television. The user interface system for such a device must provide both clear communication of computer and television related information and provide for simple control of both computer and television related features.

One problem with the current EPG system is that the program guide is typically provided in a fixed format (i.e., in a two-dimensional grid format with time information on one axis and channel information on the other axis, as described above). Since the time information axis is always labeled to show a particular time period (e.g., 5:00 p.m.-6:30 p.m.), only programs occurring at that particular time period can be displayed on the screen. In other words, if a user wants to find a program occurring before or after that time period, the user would have to scroll back or forth through the whole EPG along the time axis.

This limitation of the current EPG to only be able to show programs in a particular time period presents special problems in an EPG having searching capabilities. An example of the search capabilities is described in a co-pending U.S. application, bearing Ser. No. 08/687,285, filed Jul. 25, 1996, in the name of Maze, et al., and assigned to the same assignee of the present invention. In an apparatus described in that application, a user is able to enter a search term such as "sports" to search if there is any occurrence of a program having program guide information matching in whole or in part the entered search term. If there is a match, the EPG will then automatically advance to the time period of the first occurrence and highlights the corresponding program. An EPG screen similar to that described in the Maze application, showing the first occurrence of a selected program being highlighted is illustrated in FIG. 1.

As shown in FIG. 1, the first occurrence of a matched program being highlighted in this example is a program in cell 101. The highlighted program is "sportscenter" and the program is being shown at 5:30 p.m. on ESPN, channel 206. In this prior EPG system, however, in order for a user to find the next occurrence of a program in the EPG matching the user criteria, the user has to scroll through the whole EPG. Particularly, there is no way for a user to know in advance by looking at the screen shown in FIG. 1. whether there is any occurrence of a matched program in a specific channel, such as CNN, let alone when that occurrence will be. The only way to find that out is by scrolling through the whole EPG and carefully watching out for a highlighted program on CNN, for example.

SUMMARY OF THE INVENTION

The present inventor recognizes the problems described above in the existing EPGs. A primary object of the present invention is to overcome at least one of the aforementioned problems by providing an EPG capable of conveying information about a previous or future occurrence of a program, without the user having to scroll through or looking carefully at the whole EPG.

Therefore, a method and a related system for displaying program information in an image representing a time interval, said method comprising the steps of:

determining from said program information a first program matching a criteria and occurring at a time outside of said time interval; and generating an icon indicating that said first program matching said criteria exists and occurs at a time outside of said time interval.

BRIEF DESCRIPTION OF THE DRAWINGS

In the drawings:

FIGS. 2 and 2A show exemplary EPG menus according to a preferred embodiment of the present invention.

FIGS. 3 and 3A also show exemplary EPG menus according to the present invention.

DETAILED DESCRIPTION

Figure 1:
FIG. 1 shows a display of a prior EPG.

As described above, FIG. 1 is an example of a prior EPG menu. This EPG screen 100 is shown, for example, having a first selected program 101 as being highlighted. In this case, the first program that matches a search criteria of "sports", for example, is "sportscenter" and being shown on ESPN, channel 206, at 5:30 p.m. The user has no indication of, for example, whether there are other occurrences of programs matching the chosen criteria. That is, there is no way for a user to tell whether there is a matched program on, for example, CNN, channel 202, unless the user causes the whole EPG 100 to advance in time, while carefully monitoring the EPG for any highlighted programs. This is not only time consuming to the user but also would cause user frustration if the user ends up not finding a matched program on CNN.

FIG. 2 is an exemplary embodiment of an EPG menu according to the invention. EPG 200 in FIG. 2 shows a first highlighted program which satisfies a chosen criteria. In this example, the first selected program is also "sportscenter" on ESPN as shown in cell 201. In accordance with the present invention, however, there is additional information on EPG 200 to convey to the user about other selected programs that match the chosen criteria. This information is conveyed by icons 202–205.

Icons 202–205 are substantially in the shape of an arrow pointing to some future time. In addition, there is time information in the respective body of the icons 202–205. For example, icon 202 conveys to a user that there is an occurrence of a matched program and this next occurrence is at 11 p.m. on July 23, on CNN, channel 202. If a user is interested in finding out more about this program on this channel, the user can simply select icon 202 using a user entry device described later, and the EPG will be advanced to display the time slot of this occurrence (i.e., July 23, 11 p.m.), as shown in FIG. 3.

Note that in FIG. 2, there is no icon similar to icons 202–205 being displayed for channel 253, USA and channel 910, HBO, for example. This indicates to the user that no occurrence of a program is found in these channels matching the chosen criteria, therefore, there is no need for a user to scroll through the whole EPG to look for one in these channels.

FIG. 3 shows the display 300 of the EPG after the user has selected icon 202 in FIG. 2. As explained above, the EPG will be advanced to the time period around 11 p.m. on July 23, as indicated in icon 202. The next program matching the user entered criteria on the CNN channel will then be highlighted, in this case, the highlighted program being "sportsworld." Note that icons 203–205 still appear on the screen 300 to convey to the user that there are other matched programs further in time on the channels of ESPN, HSN and CNBC at the times denoted in icons 203–205, respectively. Furthermore, icon 302 appears on the left hand of the EPG menu 300 for the ESPN channel. This icon tells the user that he or she can also quickly go back to the previously matched program on this channel by selecting icon 302.

Other embodiments using other icons are possible. For example, icon need not indicate specific time and date of the next program. That is, the icon may be, for example, only an arrow indicating that another program exists. In addition, another embodiment may be having an icon which indicates multiple matched programs exits for a particular channel and the number of matched programs in the direction indicated by the arrow is shown in the body of the icon, as illustrated in FIGS. 2A and 3A.

Figure 2A:
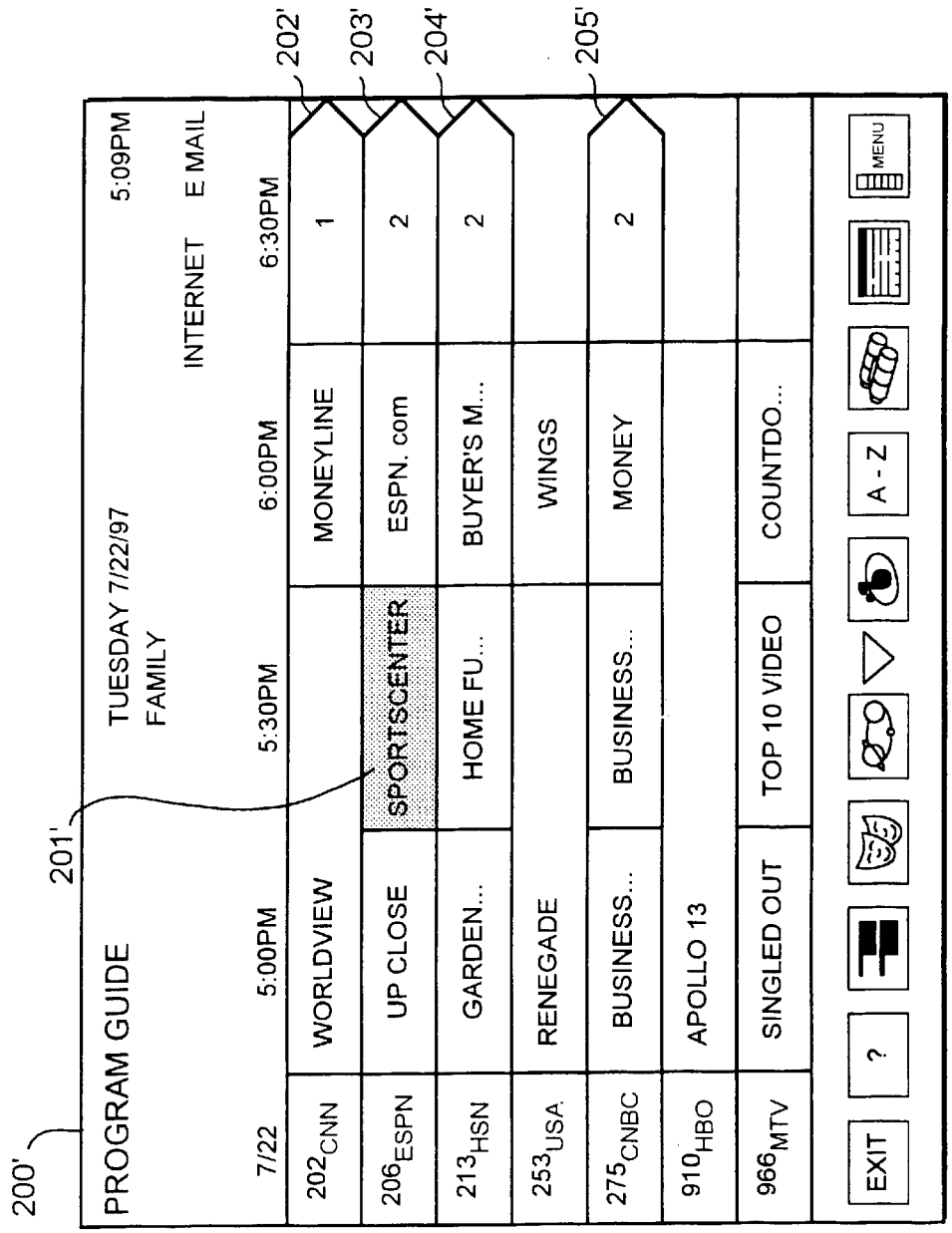

As shown in the initial EPG display 200' of FIG. 2A, a first matched program "SPORTSCENTER" is highlighted. In addition, icons 202'–205' are shown to provide additional information about the programs not shown in time interval of the current EPG screen 200'.

Each number in icon 202'–205' indicate number of matched programs to be found in the forward direction. For example, "1" in icon 202' indicates that only 1 matched program is found on channel 202, CNN.

If the user selects icon 202' in FIG. 2A, the EPG screen will be changed to highlight the matched program, as shown in FIG. 3A, icon 301'. Icon 302' in FIG. 3A conveys to the user that there is one matched program on channel 206, ESPN in the backward direction.

Figure 4:
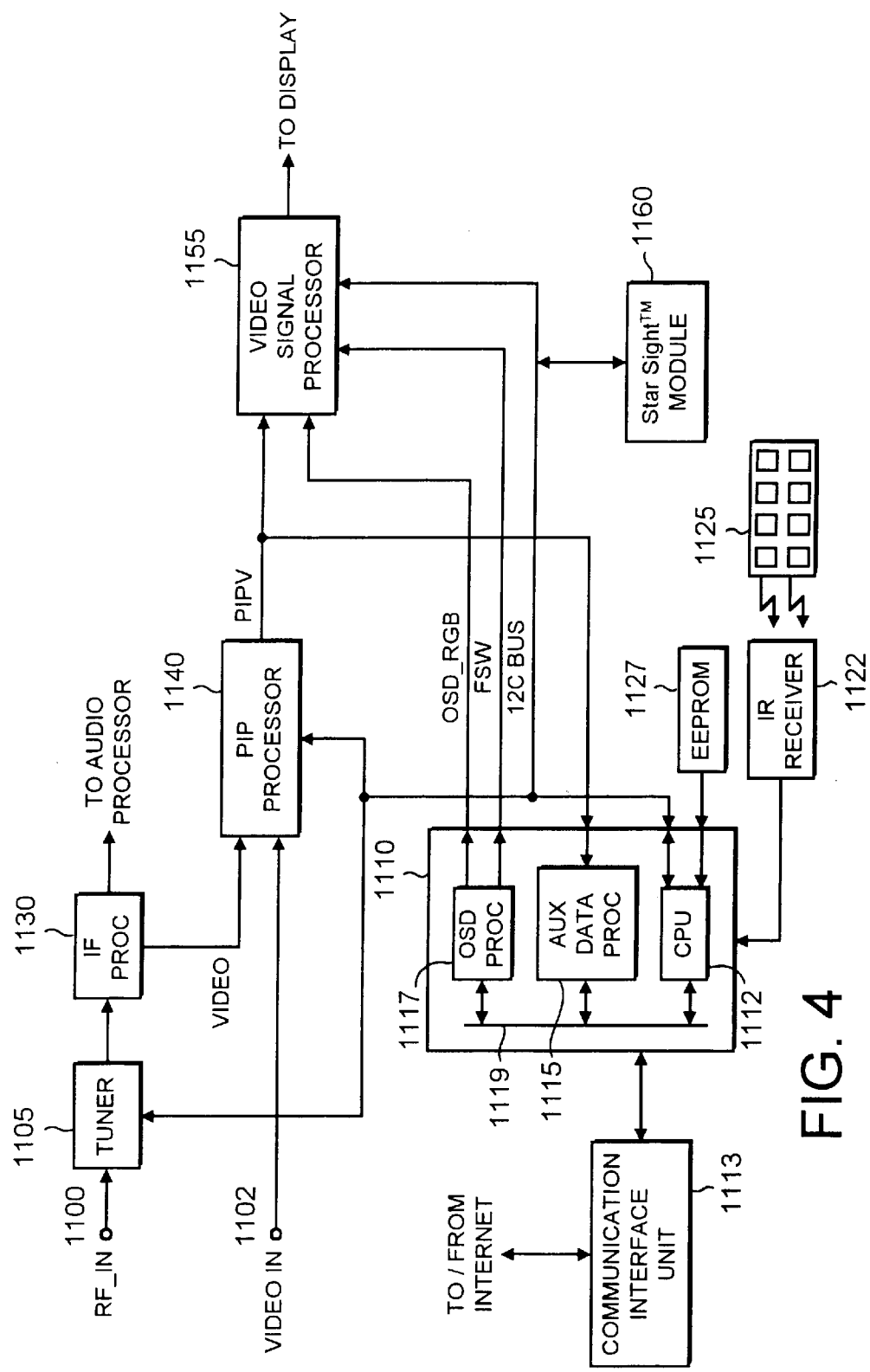
FIG. 4 shows an example of a video system suitable for processing and displaying program guide information in accordance with the present invention.

FIG. 4 shows an example of a television system suitable for processing and displaying program guide information in accordance with the present invention. The television receiver 400 shown in FIG. 4 is capable of processing both analog television signals such as the NTSC or PAL format, and Internet information. The system shown in FIG. 4 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 4) for further audio processing. Although FIG. 4 shows input 1102 as a baseband signal, the television receiver could include a second tuner and IF processor similar to units 1105 and 1130 for producing a second baseband video signal from either signal RF_IN or from a second RF signal source.

The system shown in FIG. 4 also includes a main microprocessor ($\mu$p) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within μp 1110 executes control programs contained within memory, such as EEPROM 1127 shown in FIG. 4, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Other examples of control programs stored in EEPROM 1127 are software for implementing the operations shown in FIG. 6 in accordance with the present invention as to be described below.

Main microprocessor 1110 also controls the operation of a communications interface unit 1113 for providing the capability to upload and download information to and from the Internet. Communication interface unit 1113 includes, for example, a modem for connecting to an Internet service provider, e.g., via a telephone line or via a cable television line. The communication capability allows the system shown in FIG. 4 to provide e-mail capability and Internet related features such as web browsing in addition to receiving television programming.

CPU 1112 controls functions included within μp 1110 via bus 1119 within μp 1110. In particular, CPU 1112 controls auxiliary data processor 1115 and on-screen display (OSD) processor 1117. Auxiliary data processor 1115 extracts auxiliary data such as StarSight® data from video signal PIPV.

StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures processor 1115 such that auxiliary data is extracted from portions of the television signal that includes StarSight® data. For example, in a NTSC format signal, StarSight® data may be included at least on line 16 of the vertical blanking interval. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 1125), CPU 1112 transfers formatted StarSight® EPG display data from StarSight® module 1160 via I²-C BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 4), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

For an EPG display, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes a control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The processing and displaying of a program guide in accordance with the present invention may be implemented using a combination of software and hardware. For example, referring to FIGS. 2 and 3, display of an EPG may be implemented by software in memory such as EEPROM 1127. Activation of an EPG, e.g., by a user pressing an EPG related button on remote control 1125, causes CPU 1112 to execute the EPG software routine shown in FIG. 6 and described below. As part of generating an EPG display, CPU 1112 also accesses EPG data and graphics that may be stored in StarSight® module 1160 via the I2C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 4 that have been described thus far comprises an ST9296 microprocessor produced by SGS-Thomson Microelectronics for providing the features associated with μp 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 5:
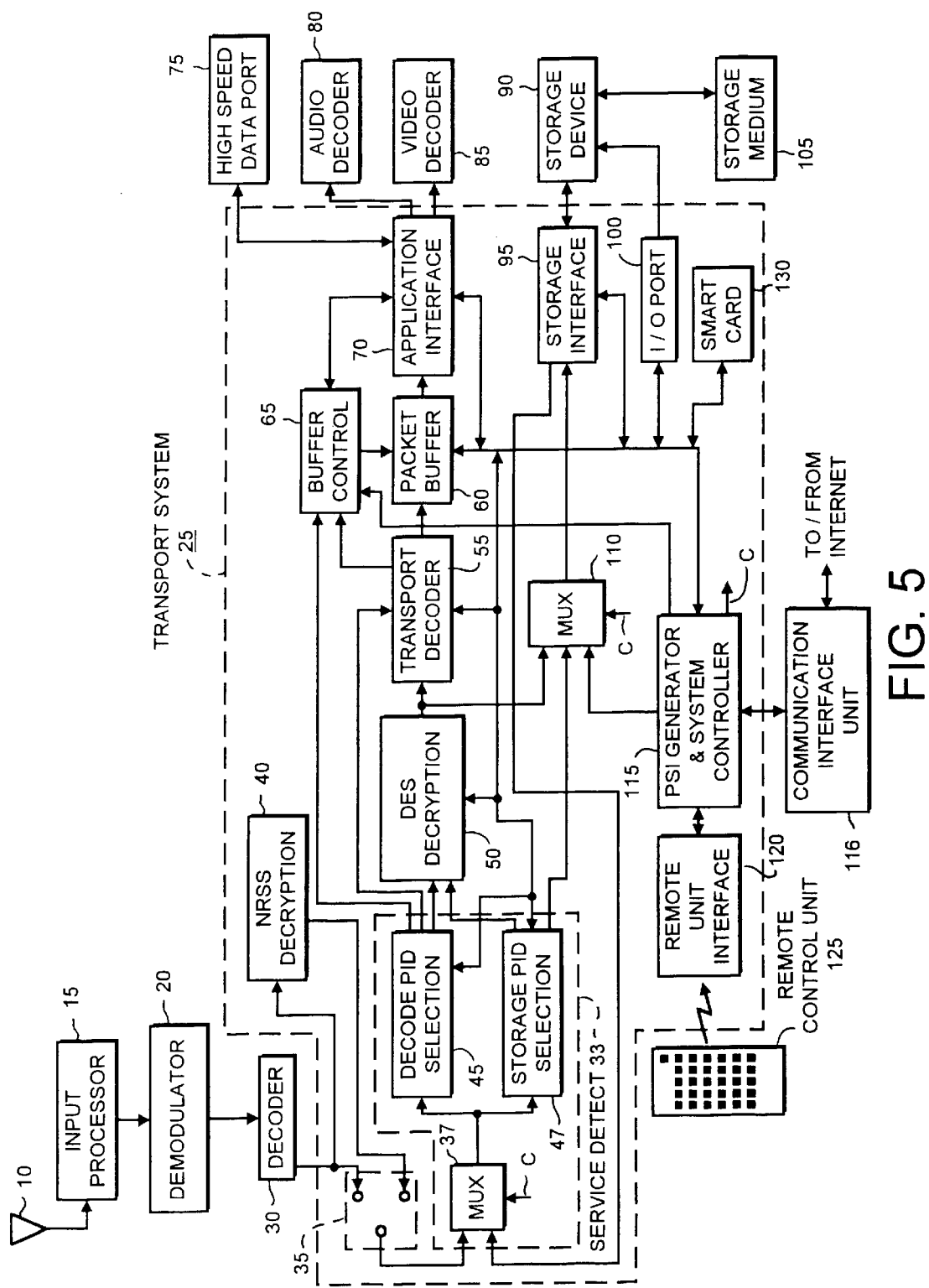
FIG. 5. shows an example of a digital video processing apparatus suitable for processing and displaying program guide information in accordance with the present invention.

FIG. 5 shows another example of an electronic device capable of processing and customizing program guide information in accordance with the present invention. As described below, the system shown in FIG. 5 is an MPEG compatible system for receiving MPEG encoded transport streams representing broadcast programs. However, the system shown in FIG. 5 is exemplary only. User interface systems are also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as digital video and/or audio information received via cable, telephone messages, computer programs, Internet data, audio presentations (e.g., from a remote source or from a local source, such as a compact disk or other audio medium), visual presentations, audiovisual presentations (e.g., from a remote source or a local source, such as a compact disk or other audio medium), or other communications, for example.

In overview, in the video receiver system of FIG. 5, a carrier modulated with video data is received by antenna 10 and processed by input processor unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 5 in detail, a carrier modulated with video and/or audio data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information. As discussed above, the program description may comprise different program descriptive fields such as title, star, rating, etc., relating to a program.

The user interface incorporated in the video receiver shown in FIG. 5 enables a user to activate various features by selecting a desired feature from an on-screen display (OSD) menu. The OSD menu includes an electronic program guide (EPG) as described above and other features discussed below. Data representing information displayed in the OSD menu is generated by system controller 115 in response to stored program guide information, stored graphics information, and/or program guide and graphics information received via the input signal as described above and in accordance with an exemplary control program to be shown in FIG. 6 and to be described below. The software control program may be stored, for example, in embedded memory (not shown) of system controller 115.

Using remote control unit 125 (or other selection means such as a mouse) a user can select from the OSD menu items such as, for example, an icon to be selected, a program to be viewed, a program to be stored, the type of storage media and manner of storage, and scrolling of the EPG. System controller 115 uses the selection information, provided via remote unit interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. This approach places all security related functions in one removable unit that easily can be replaced if a service provider decides to change encryption technique or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input datastream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption techniques such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 4. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 5 to provide e-mail capability and Internet related features such as web browsing in addition to receiving television programming.

Figure 6:
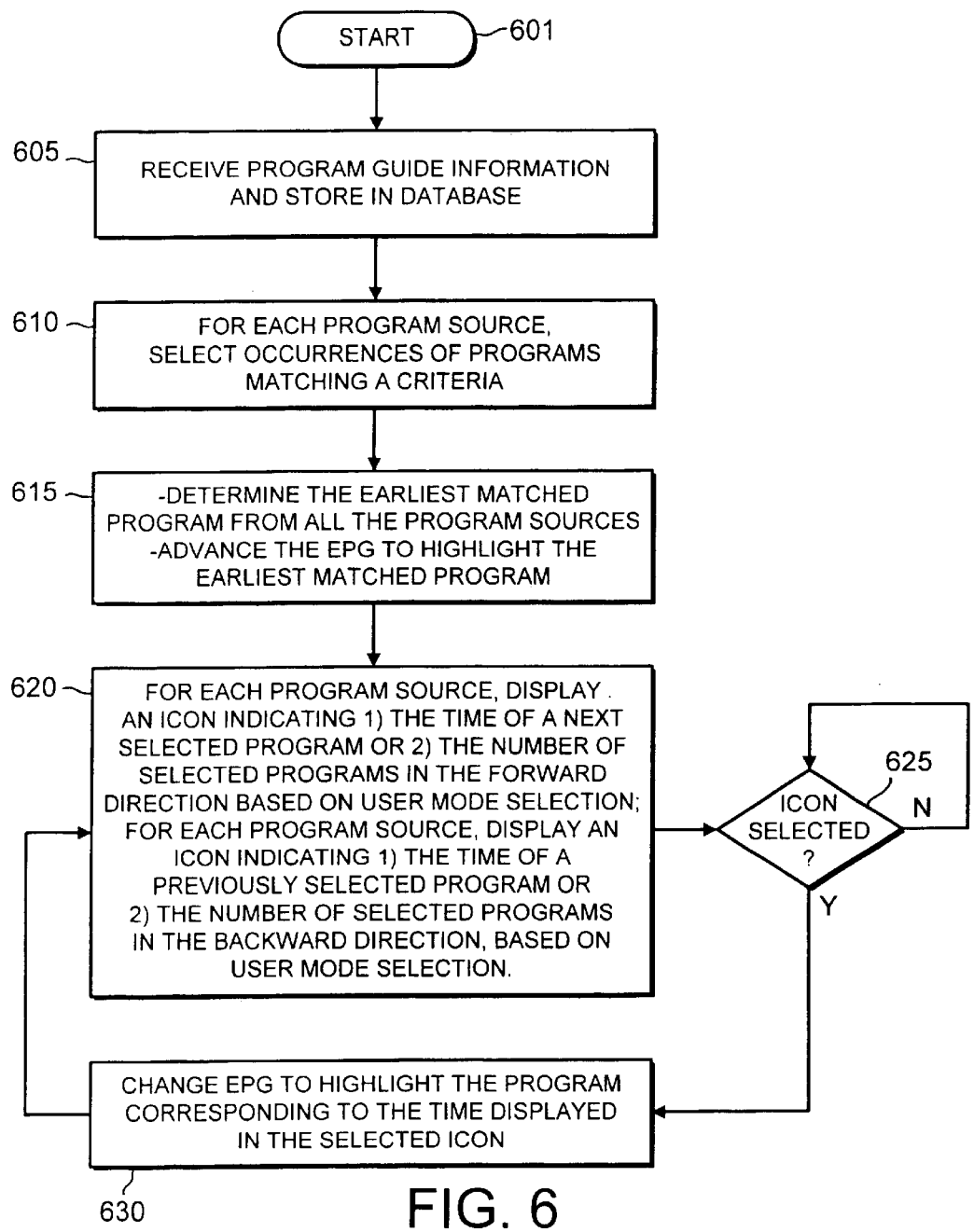
FIG. 6 is a flow chart of a method of processing and displaying program guide information in accordance with a preferred implementation of the present invention.

FIG. 6 is a flow chart of an exemplary control program which, according to the present invention, may be executed by controller 1110 of FIG. 4, controller 115 of FIG. 5, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., video tape recorders), satellite television and/or data signal converters, program guide receiver units, and the like, regardless of whether incorporated into a television receiver or personal computer or connected externally thereto. It will be appreciated that the exemplary control program may be implemented in hardware, software, or a combination thereof.

The exemplary control program, when executed, facilitates display of a program guide, shown, for example, in FIGS. 2 and 3. A person skilled in the art would readily recognize from the flow chart and the following description that the control program, for example, when executed by any one of the systems described in FIGS. 4 and 5 or by any other suitably programmed electronic host device will provide substantially the same features and advantages in accordance with the present invention. Therefore, to avoid redundancy, the control program will be described below only with respect to the exemplary hardware implementation shown in FIG. 4.

Step 605 of FIG. 5 shows that system 400 of FIG. 4 receives program guide information for a plurality of program sources such as television channels, as discussed above in connection with FIG. 4. In step 610, system 400 processes the EPG information received and makes a determination of all occurrences of all the programs in the EPG matching a chosen criteria. The chosen criteria is not limited to a search term, but may also include and is not limited to a theme, category, actors, directors, ratings, etc. of a program. In step 615, system 400 finds the earliest matched program from all the program sources in the EPG and causes the EPG to advance to the time period where this program appears, and highlights this program, as shown, for example by highlighted program 201, in FIG. 2.

In addition, in step 620, system 400 will cause an icon to be displayed for a respective program source, if applicable. This icon will indicate for the respective channel, for example, either the time of the next occurrence of a program matching the chosen criteria as shown, for example, in FIG. 2; or the number of occurrences of a program matching the chosen criteria in the direction of the arrow as shown, for example, in FIG. 2A. What is displayed in the icons is determined, for example, by user selecting the mode of icon display. In addition, if the displayed EPG screen is not an initial screen as shown in FIG. 2 or FIG. 2A, but has already been advanced by a user as shown in FIG. 3 or FIG. 3A, system 400 will also cause another set of icons to be displayed, if applicable. This set of icons is illustrated, for example, by icon 302 of FIG. 3 or icon 302' of FIG. 3A, indicating the time and direction of a previously selected program; or the number of selected programs in the backward direction. Similarly, a user can switch to different types of information displayed by choose a respective display mode.

System 400 will then monitor whether any of the icons displayed is selected by a user, e.g., by activation or selection key on a remote control, as in step 625. If an icon is selected by the user the EPG display will then be changed to display the EPG portion encompassing the selected and highlight the program corresponding to the time indicated in the selected icon, as shown in step 630.

It is to be understood that the embodiments and variations shown and described herein are for illustrations only and that various modifications may be implemented by those skilled in the art without departing from the scope and spirit of the invention.

What is claimed is:

1. A method for displaying program information for a plurality of information sources on a program guide grid comprising the steps of:

determining a first matched program and its associated program source;

displaying a program guide grid having a plurality of displayed program sources on a first axis wherein the displayed program sources includes the associated program source for the first matched program, a displayed time interval on a second axis and programs associated with the plurality of displayed program sources for the displayed time interval;

highlighting said first matched program within said displayed program guide grid; and indicating within the displayed program guide grid for each displayed program source whether the displayed program source has at least one other matched program schedule outside the displayed time interval.

2. The method of claim 1, wherein the indicating step and the highlighting step occur simultaneously.

3. The method of claim 1, wherein the indicating step comprises the step of indicating the number of the matched programs, associated with the displayed program source, scheduled outside the displayed time interval.

4. The method of claim 3, wherein the indicating step further comprises the step of indicating the direction in time of the matched programs.

5. The method of claim 1, wherein the indicating step comprises the step of displaying an icon for those displayed program sources having the at least one other matched program, the icon indicating a time and date outside the displayed time interval.

6. The method of claim 5, further comprising the steps of:

receiving a selection of said icon;

advancing the program guide grid having the plurality of displayed program sources on the first axis, to a second displayed time interval on the second axis wherein the second displayed time interval includes the time and date of the selected icon and programs associated with the plurality of displayed program sources for the second displayed time interval; and highlighting the matched program in the program guide grid associated with the selected icon.

7. The method of claim 6, further comprising the steps of:

indicating the first matched program occurring in the first time interval when the program guide grid is advanced to the second displayed time interval; and indicating within the program guide grid for each displayed program source whether the displayed program source has the at least one other matched program beyond the second displayed time interval.

8. The method of claim 7, wherein the indicating steps and the highlighting step occur simultaneously.

9. A method for processing program guide information comprising the steps of:

receiving said program guide information;

receiving a user-entered request;

determining the occurrence of programs matching the user-entered request;

displaying a program guide grid identifying a plurality of program sources on a first axis, time information on a second axis and a plurality of programs associated with the program sources for a displayed time interval of said time information axis wherein the plurality of programs includes a first program matching said user-entered request;

highlighting said first program matching in said displayed program guide grid; and simultaneously with the highlighting step, displaying within said displayed program guide grid an indicator for each respective program source having another matched program scheduled outside said displayed time interval.

10. The method of claim 9, wherein the step of displaying within the displayed program guide grid further comprises the step of indicating, for each respective program source, the number of the matched programs, associated therewith scheduled outside the displayed time interval.

11. The method of claim 10, wherein the indicating step further comprises the step of indicating the direction in time of the matched programs.

12. The method of claim 9, wherein the indicating step comprises the step of displaying with said indicator for those displayed program sources having the at least one other matched program a time and date outside the displayed time interval.

13. The method of claim 9, further comprising the steps of:

receiving a selection of said indicator;

advancing the program guide grid having the plurality of displayed program sources on the first axis, to a second displayed time interval on the second axis wherein the second displayed time interval includes the time and date of the selected indicator and programs associated with the plurality of displayed program sources for the updated displayed time interval; and highlighting the matched program in the program guide grid associated with the selected indicator.

14. The method of claim 13, further comprising the steps of:

indicating the first matched program occurring in the first time interval when the program guide grid is advanced to the second displayed time interval; and indicating within the program guide grid for each displayed program source whether the displayed program source has the at least one other matched program beyond the second displayed time interval.

15. An apparatus for processing program guide information comprising:

means for receiving slid program guide information;

means for receiving a user-entered request;

means for determining the occurrence of programs matching the user-entered request;

means for displaying a program guide grid identifying a plurality of program sources on a first axis, time information on a second axis and a plurality of programs associated with the program sources for a displayed time interval of said time information axis wherein the plurality of programs includes a first program matching said user-entered request;

means for highlighting said first program matching in said displayed program guide grid; and means for displaying within said displayed program guide grid, simultaneously with the highlighted first program, an indicator for each respective program source having another matched program scheduled outside said displayed time interval.

16. The apparatus of claim 15, wherein the means for displaying within the displayed program guide grid comprises means for indicating, for each respective program source, the number of the matched programs associated therewith scheduled outside the displayed time interval.

17. The apparatus of claim 16, wherein the indicating means comprises means for indicating the direction in time of the matched programs.

18. The apparatus of claim 15, wherein the means for displaying within the displayed program guide comprises means for displaying with said indicator for those displayed program sources having the at least one other matched program a time and date outside the displayed time interval.

19. The apparatus of claim 15, further comprising:

means for receiving a selection of said indicator;

means for advancing the program guide grid having the plurality of displayed program sources on the first axis, to a second displayed time interval on the second axis wherein the second displayed time interval includes the time and date of the selected indicator and programs associated with the plurality of displayed program sources for the updated displayed time interval; and means for highlighting the matched program in the program guide grid associated with the selected indicator.

20. The apparatus of claim 15, wherein the means for displaying within the displayed program guide grid comprises:

means for indicating the first matched program occurring in the first time interval when the program guide grid is advanced to the second displayed time interval; and means for indicating within the program guide grid for each displayed program source whether the displayed program source has the at least one other matched program beyond the second displayed time interval.

* * * * *